United States Patent [19]

Ibaraki et al.

[11] Patent Number: 5,135,572
[45] Date of Patent: Aug. 4, 1992

[54] METHOD FOR IN-BATH SMELTING REDUCTION OF METALS

[75] Inventors: Tetsuharu Ibaraki; Michitaka Kanemoto; Masao Yamauchi, all of Sakai; Chikara Saito; Hiromitsu Moridera, both of Kitakyushu, all of Japan

[73] Assignee: Nippon Steel Corporation, Tokyo, Japan

[21] Appl. No.: 569,282

[22] Filed: Aug. 17, 1990

[30] Foreign Application Priority Data

Aug. 29, 1989 [JP] Japan .................. 1-220419
Sep. 4, 1989 [JP] Japan .................. 1-227553
Dec. 22, 1989 [JP] Japan .................. 1-333262

[51] Int. Cl.⁵ .............................................. C21B 13/00
[52] U.S. Cl. ..................................... 75/502; 75/531; 75/532
[58] Field of Search ............ 75/531, 532, 500, 501, 75/502; 266/182

[56] References Cited

U.S. PATENT DOCUMENTS 4,411,697 10/1983 Spenceley et al. ................... 75/532
4,936,908 6/1990 Takahashi et al. ................... 75/502

FOREIGN PATENT DOCUMENTS 153819 9/1984 Japan .................. 75/352
61-199009 9/1986 Japan .
62-24486 5/1987 Japan .
62-280311 12/1987 Japan .
62-283190 12/1987 Japan .
1-247516 10/1989 Japan .................. 75/502

Primary Examiner—Melvyn J. Andrews
Attorney, Agent, or Firm—Wenderoth, Lind & Ponack

[57] ABSTRACT

A method of in-bath smelting reduction comprises the step of selectively supplying powder materials into a gas upflow region or a gas downflow region within a furnace during the time that oxygen-containing gas is concurrently being blown into the furnace from a top lance. Also disclosed is an in-bath smelting reduction furnace for carrying out the method.

5 Claims, 10 Drawing Sheets

FIG. 7
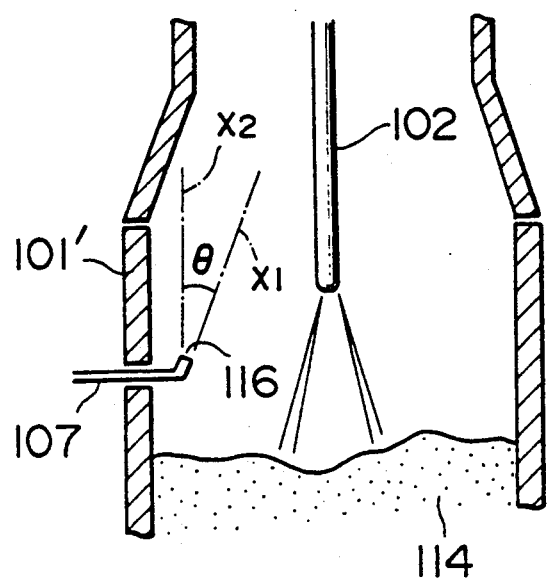
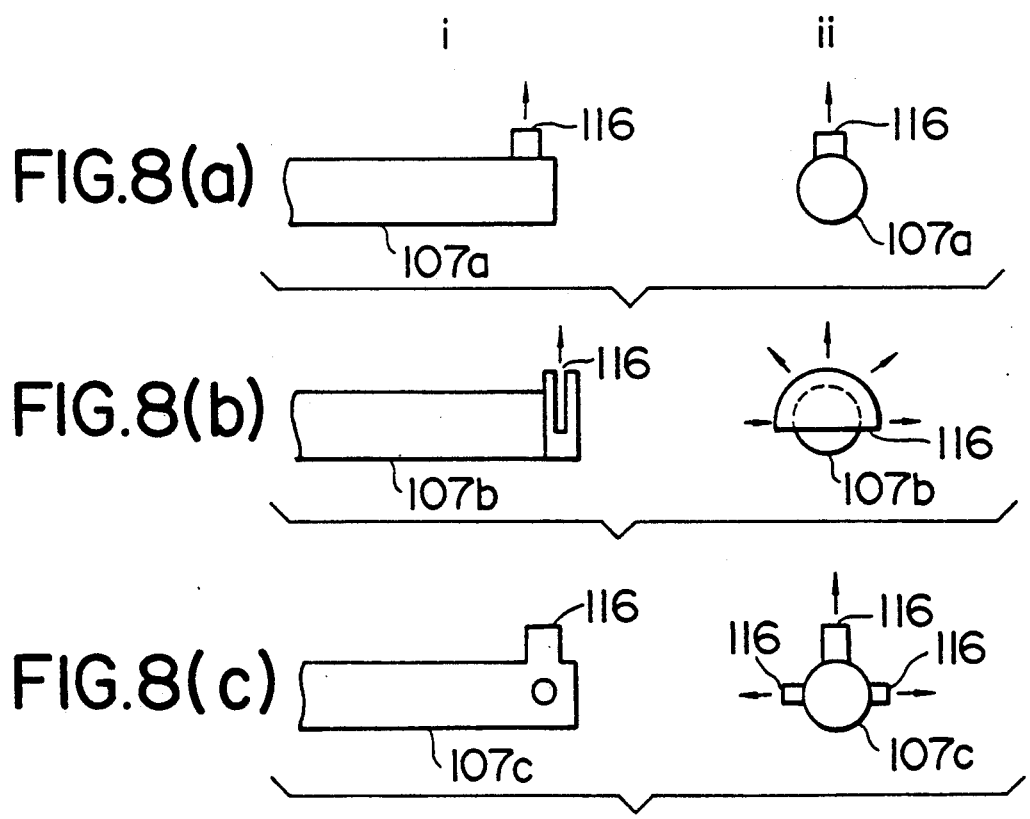

METHOD FOR IN-BATH SMELTING REDUCTION OF METALS

BACKGROUND OF THE INVENTION

1. Field of the invention

The present invention relates to a method for in-bath smelting reduction of metal oxides, and more particularly to an in-bath smelting reduction method for production of iron and ferro-alloys, and an in-bath smelting reduction furnace.

2. Description of the prior art

In connection with iron melt reaction vessels such as the oxygen converter, various methods have been developed for enabling more efficient feeding of iron ore as a coolant, coke and other carbon materials as a heat source, and fluxes. In converter operation, however, it was for a long time the general practice to feed most materials in lump form, and where a powder material was to be supplied, to first form it into lumps and then to charge the lumps into the furnace from the top under their own weight.

On the other hand, recent years have seen vigorous efforts to develop ways for supplying iron ore, carbon materials and other materials to converters in powder form. JP-B-62-24486, for example, discloses a technique for using powder materials as a slag suppressing agent. According to the disclosed method, powder material is supplied through an opening of the converter side wall when the slag within the converter foams and tends to slop.

There have also been seen positive efforts to adopt in-bath smelting reduction of ore, a method in which ore, carbon material as both a reducing agent and a heat source, lime as a flux and the like are supplied into molten metal (hereinafter called the "hot metal") in a smelting furnace, and oxygen gas is blown onto the hot metal.

JP-A-61-199009, for example, discloses a method for supplying the materials in such in-bath smelting reduction, in which the ore, carbon materials and other materials are classified into lumps and powder by a comb, the lump materials of greater than a prescribed size are fed into the furnace from a material charging apparatus installed above the furnace, and the powder materials smaller than the prescribed size (hereinafter called "powder materials") are blown into the molten iron or the slag layer within the furnace by a powder supply apparatus.

For enabling efficient and economical supply of the great amount of heat that is consumed within the furnace in in-bath smelting reduction, numerous different attempts have been made toward raising the post combustion ratio so as to increase the amount of heat generated per unit amount of coal. The possibility for such an increase comes from the fact that while the amount of heat generated by oxidizing carbon to carbon monoxide is only about 2200 kcal/kg - C, that generated when carbon is oxidized to carbon dioxide is about 7800 kcal/kg - C, thus enabling generation of more heat per kg of carbon and $Nm^3$ of oxygen. Moreover, as hydrogen burns only during post combustion, post combustion is indispensable for effective utilization of the combustion heat of hydrogen.

JP-A-62-280311 discloses a method of operating an in-bath smelting reduction furnace which aims at increasing the amount of heat generated from coal and improving heat efficiency by obtaining a high post combustion ratio and efficiently transferring the heat of the post combustion to the hot metal.

However, even if the post combustion ratio in the in-bath smelting reduction furnace is increased, insofar as fuel coal having a high volatile matter (hereinafter called VM) content of 25–40% is directly used in the furnace as fuel, the practical limit on the post combustion ratio becomes about 40–50%. This is because high VM-content fuel coal exhibits poor combustion characteristics in the in-bath smelting reduction furnace so that when the furnace is operated at a high post combustion ratio, the heat transfer efficiency becomes poor.

Thus when fuel coal is used, the heat transfer efficiency rapidly worsens during high post combustion operation. A problem in operation therefore arises that in the case where the post combustion ratio is increased in the in-bath smelting reduction furnace using fuel coal, the amount of heat generated per unit volume of the space in the furnace above the slag increases, with the result that the gas temperature rises sharply.

For example, if the post combustion ratio should be 50%, then even if operation should be conducted at the relatively good heat transfer efficiency of 80%, the gas temperature at the top of the furnace will become 1900° C., which is much higher than the refractory at the top of the furnace can withstand. This is hardly conducive to economical metal production.

While there are a number of operational factors that affect the refractory wear rate, the most effective method for reducing wear is to reduce the temperature at the refractory hot face. As it is known that the refractory wear rate is increased when the portion of the refractory in contact with gas is exposed to highly oxidative gas, another effective way of protecting the refractory is to reduce the oxidation degree of the gas.

Combined reduction of the temperature and oxidation degree of the gas is, however, incompatible with reducing the unit consumption of coal by increasing the post combustion ratio and transferring a large amount of heat to the hot metal. By the conventional methods, therefore, it has been difficult to carry out operation at low unit consumption of coal while realizing long refractory service life.

On the other hand, pre-reduction of ore as the raw material is an effective method for reducing the unit consumption of coal. This is related to the fact that iron ore used for producing the hot metal is mainly hematite ($Fe_2O_3$) and magnetite ($Fe_3O_4$) and where C is consumed for reducing these iron oxides, the amount of reduction heat becomes huge, making it impossible to reduce the unit consumption of ore.

By pre-reducing the iron ore, however, the oxygen content of the iron oxides can be reduced, whereby the amount of carbon consumed for reduction can be lowered. At the same time, since the amount of reduction heat required when the iron oxides are reduced decreases, it becomes possible to reduce the amount of coal combustion heat. For these reasons, pre-reduction of the iron ore is a highly effective method of reducing the unit consumption of coal.

The gas generated from the in-bath smelting reduction furnace consists of $H_2O$, $H_2$, $CO$, $CO_2$ and $N_2$, and in the in-bath smelting reduction of iron, effective utilization of this gas for pre-reduction of iron ore is highly preferable. A number of different methods for this purpose have been proposed.

In one method for efficient pre-reduction of iron ore, the reduction efficiency in the pre-reduction furnace is increased by cooling the gas to remove as water the $H_2O$ which tends to hinder the ore reduction, and by removing carbonic acid in the gas in order to reduce amount of $CO_2$, which also hinders reduction.

However, for removal of water and carbonic acid, it is necessary to cool the gas to room temperature and then to reheat it to 800°–1000° C., the temperature required for using it to pre-reduce iron ore.

By this method, the oxidation degree (($P_{CO_2}+P_{H_2O}$)/($P_{CO_2}+P_{CO}+P_{H_2}+P_{H_2O}$)) of the gas for the pre-reduction can be reduced to an appropriate ratio for ore reduction and the chemical equilibrium and reaction rate of the ore reduction can be improved so that it is possible to obtain a reduction ratio that is preferable for the in-bath smelting reduction.

However, this pre-reduction method proves to be uneconomical since it requires huge investment cost for such equipment as a waste heat boiler for cooling the gas generated by the smelting reduction furnace, a dust catcher, a water remover, a remover of carbonic acid, a gas holder for preventing supply-demand imbalances, a gas pressurizer and a heat exchanger for heating gas.

For avoiding the need for such large scale equipment and reducing investment costs, there has been developed an ore pre-reduction method wherein the gas generated from the smelting reduction furnace is not cooled to room temperature but only to the temperature appropriate for pre-reduction and the gas is supplied directly to the pre-reduction furnace and used for the pre-reduction of ore. This method is effective toward reducing investment costs since about the only equipment required is a recovery duct for the generated gas and a dust catcher.

With this method, however, the oxidation degree of the gas generated by the smelting reduction furnace is determined by the post combustion ratio in the in-bath smelting reduction furnace and therefore cannot be reduced.

With this method, if the operation is carried out at a low post combustion ratio in the in-bath smelting reduction furnace of around 20–30%, then as might be expected from the chemical equilibrium at a pre-reduction temperature of 800°–1000° C., the ore ($Fe_2O_3$) is partially reduced to metallic iron and it is possible to obtain an ore pre-reduction ratio of about 40%.

At a pre-reduction ratio of 40% and a post combustion ratio of around 20% in the in-bath smelting reduction furnace, however, the unit consumption of coal required for operation comes to exceed 1100 kg/t, which is considerably greater than the 700–800 kg/t coal unit consumption of the coke oven - blast furnace method. It is thus impossible to produce hot metal economically using this method.

An improvement of the condition of heat balance in the in-bath smelting reduction furnace can be realized by an operating method in which the unit consumption of coal is reduced by increasing the post combustion ratio in the in-bath smelting reduction furnace so as to increase the amount of heat supplied to the hot metal per unit coal weight. However, the oxidation degree of the gas generated from the in-bath smelting reduction at a high post combustion ratio of 40–50% is such that adequate pre-reduction of the ore cannot be obtained if the gas is directly used for pre-reduction without removal of water or carbonic acid.

This is because if gas with such an oxidation degree should be used, at a reduction temperature in the range of 800°–1000° C. ordinarily used in pre-reduction furnaces, it would be possible, under conditions of chemical equilibrium, to realize reduction only to as far as $Fe_3O_4$. Thus in the case of hematite ore ($Fe_2O_3$), the pre-reduction ratio would be about 11% and in the case of iron sand and other magnetite ores, there would be no reduction whatsoever. What this means is that the reduction would be controlled by the chemical equilibrium determined by the composition of the gas after post combustion, making it impossible to obtain a high pre-reduction.

In an in-bath smelting reduction furnace that directly uses fuel coal, therefore, the pre-reduction ratio remains at a low level even if the post combustion ratio is improved to 40–50%, so that the unit consumption of coal cannot be sufficiently reduced and, at best, is only about 900 kg/T.

As was mentioned earlier, it is known that the post combustion ratio in the in-bath smelting reduction furnace is strongly influenced by the average VM content of the carbon materials.

Fuel coal, which is cheap and is produced in large quantities, normally has a VM content of 25–40%. Where it is attempted to produce hot metal economically using fuel coal, if the fuel coal is used in the in-bath smelting reduction furnace as it is, the post combustion ratio at which a relatively high heat efficiency is attained is 40–50%. That is to say, for supplying the heat required for smelting reduction of the ore, it is further necessary to reduce the unit consumption of coal by further simultaneously increasing the post combustion ratio and the heat transfer efficiency.

One way of doing this is by partially carbonizing the coal to lower its VM content. However, this leads to an increase in facility costs because the ordinary method of coal carbonization requires a special coal carbonization furnace, and there are also additional costs for the heat required for the carbonization.

Thus unless some method is devised for avoiding the need for a special carbonation furnace and for carrying out the carbonation efficiently, it is impossible to produce hot metal by using coal which has been partially and economically carbonized.

It is for this reason that there has been a desire to develop technology making it possible to reduce the unit consumption of coal by enabling both coal carbonization and reduction of the oxidation degree of the gas generated by the in-bath smelting reduction, and also enabling economical coal carbonization and gas reforming, without leading to an increase in running costs and investment cost.

In other words, for economical production of hot metal there is needed a method which is capable of reducing the oxidation degree of the gas generated by the smelting reduction furnace and also capable of partially carbonizing coal, with simple and inexpensive equipment.

When fuel coal is unloaded at the steelworks, it contains around 10–20% powder of a particle size of under 2 mm, owing partly to pulverization during transport and to powder produced during screening.

Unless this coal powder (slack) can be effectively utilized, the excess has to be processed into usable form or abandoned, which leads to increased costs for the processing equipment. For economical hot metal production it is therefore important to make effective use of this slack. If the slack is charged into the in-bath smelting reduction furnace from the top, however, the upflow of gas generated by the in-bath smelting reduction furnace entrains and carries away a part of the slack so that it cannot be efficiently utilized.

Regarding coal carbonization and gas reforming (a method for reducing the oxidation degree of gas), JP-A-62-283190, for example, discloses a method for gasifying coke using gas generated by an in-bath smelting reduction furnace or a coal gasifier. By this method, only highly gas permeable lump coke can be used as the carbon material for gasification.

This is because if coal containing VM should be used in this method, tar produced during carbonization would liquefy when the gas temperature decreased and the liquefied tar would obstruct the passage of gas. It is therefore difficult to carbonize coal including powder by this method.

It is known that powder ore is easier to mine than lump ore and that its quality can be improved by washing with water or floatation. Moreover, making good use of this powder ore is important for economical production of hot metal.

Also, if it should be possible to use powder ore for refractory cooling and the like, this would not cause any increase in cost or entail any loss of heat by feeding otherwise unnecessary substances into the furnace. This same principle can also be adopted in respect of powder fluxes such as lime.

SUMMARY OF THE INVENTION

One object of this invention is to provide a method of smelting reduction wherein the stream of gas produced by the in-bath smelting reduction furnace is used to supply powder materials at good yield.

Another object of this invention is to provide a method of smelting reduction wherein the iron ore reduction efficiency in the pre-reduction furnace is increased, the unit consumption of coal is reduced by increasing the post combustion ratio in the in-bath smelting reduction furnace, the investment costs are reduced by prolonging the service life of the in-bath smelting reduction furnace refractory, and the production costs are low.

Another object of this invention is to provide an in-bath smelting reduction furnace wherein the period between refractory repair operations is prolonged by providing the furnace body with cooling capability.

DESCRIPTION OF THE DRAWINGS

FIG. 7 is a partial sectional view of an in-bath smelting reduction furnace in accordance with the invention.

FIGS. 8(a), (b) and (c) are schematic views of pipes for injection of slack, wherein side views are shown under (i) and front views are shown under (ii).

DETAILED DESCRIPTION OF THE INVENTION

Figure 1:
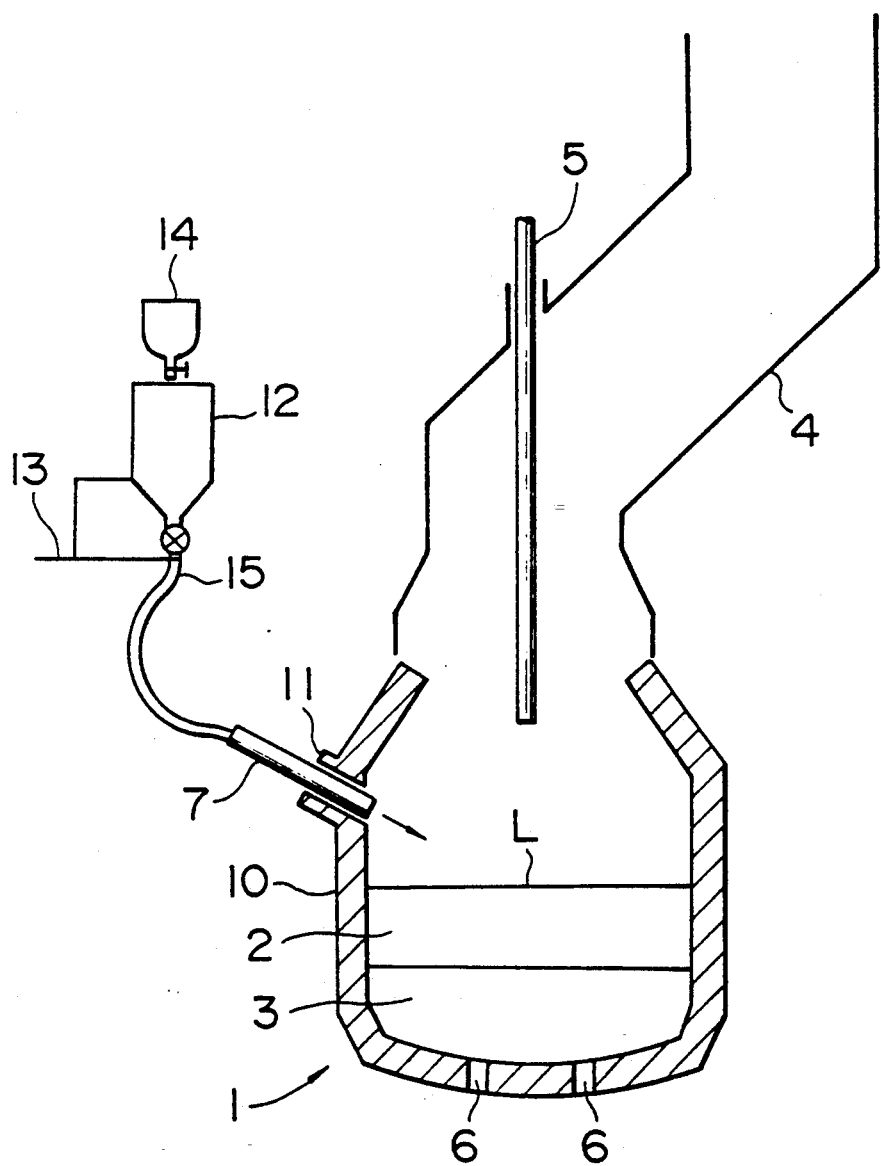
FIG. 1 is an overall sectional view of a system for implementing the method of the present invention.

An example of the method of operation according to this invention will first be explained with reference to FIG. 1. In FIG. 1, reference numeral 1 designates an in-bath smelting reduction furnace, 2 designates molten slag, 3 designates molten metal (molten iron), and 4 designates an off-gas duct. Oxygen is supplied from the top through a top lance 5 which passes through the wall of the off-gas duct 4 and gas for agitation is supplied through bottom bubbling tuyeres 6 at the furnace bottom. Reference numeral 7 designates a powder material feeder which is inserted through a furnace wall opening 11.

The feeder 7 is connected via a feed pipe 15 with a powder material hopper 12. The feed pipe 15 further has connected therewith a carrier gas supply pipe 13 for supplying a carrier gas to entrain and transport the powder materials under conditions that will be explained later.

Inert gases such as argon and nitrogen and carbonic acid gas can be used as the carrier gas.

As will be understood from the ensuing explanation, in accordance with the present invention the powder materials are supplied to the melt surface within a circle on the melt surface having its center at the furnace center and having a diameter that is $\frac{2}{3}$ the furnace diameter in order to supply powder materials to a furnace at high yield.

Figure 2:
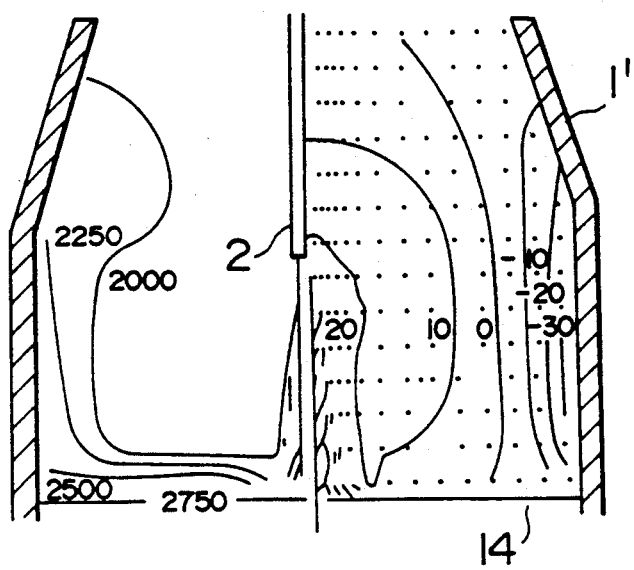
FIG. 2 is a partial analytical view of the melt reaction vessel according to the invention.

The inventors simulated the flow and reaction of the fluid (gas) in a melt reaction vessel and obtained the results shown in FIG. 2.

The figures in the left half of FIG. 2 indicate temperature in °C., while the figures in the right half indicate gas flow velocity in m/sec, where negative numbers designate upward flow and positive numbers downward flow. The gas was found to flow toward the melt surface at the furnace center (within about $\frac{2}{3}$ the radial distance from the center) and to flow toward the top of the furnace at a very high velocity in the vicinity of the furnace wall (about $\frac{1}{3}$ the radial distance on the wall side).

By taking advantage of this flow pattern, it is possible to supply powder materials to the furnace at high yield.

Thus in one aspect of this invention powder materials are supplied to the gas downflow between the furnace center and $\frac{2}{3}$ the radial distance from the center.

Figure 3:
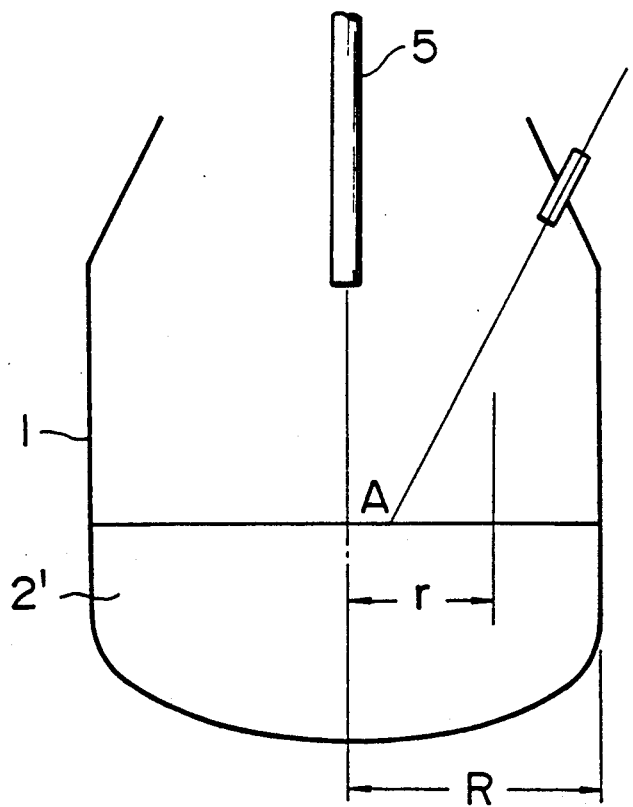
FIG. 3 is an explanatory view illustrating the effect of the invention.

FIG. 3 is a schematic view of one part of the view in FIG. 1.

In FIG. 3, A indicates the point of intersection between a line extended in the direction in which the powder material is supplied and the melt surface, R indicates the radius of the furnace and r indicates distance away from the furnace center in the radial direction.

In this aspect of the present invention one or more openings are opened in the furnace shoulder and powder materials are fed into the furnace through these holes together with carrier gas. In this case it is important for the injection angle to be such that the point of intersection between the center axis in the direction of injection and the melt surface falls within ⅔ of the diameter of the cross-section of the furnace interior.

Since as mentioned earlier there is a very high velocity upflow in the vicinity of the furnace wall, in the case of injecting the powder materials from the wall it is necessary to ensure that the vertically downward component of the jetting velocity at the nozzle(s) is greater than the velocity of the upflow of the gas within the furnace.

Since tests show that the upflow velocity is almost always on the order of 30-50 m/s, in the supplying of powder materials it suffices to make the vertically downward velocity component of the jetting velocity greater than this value.

Instead of injecting the powder materials through openings in the furnace wall, it is alternatively possible to supply them to within ⅔ of the internal furnace cross-section using one or more auxiliary lances inserted from the top of the furnace. In this case, the injected powder materials are not exposed to the high-velocity upflow in the vicinity of the furnace wall so that the jetting velocity can be made lower.

Figure 4:
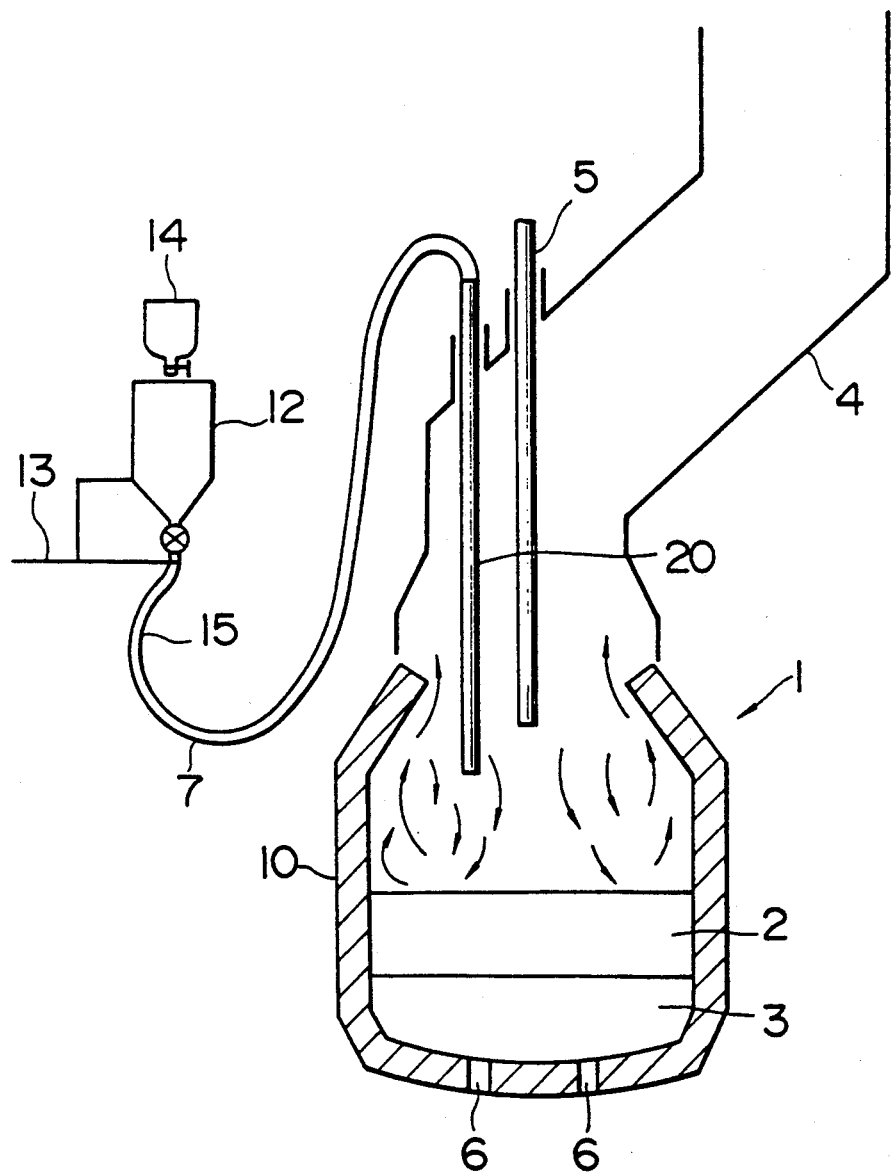
FIG. 4 is an explanatory sectional view of a system for implementing another embodiment of the invention.

FIG. 4 is a sectional view illustrating the operation in the case where the powder materials are supplied into the furnace through an auxiliary lance inserted from the top of the furnace.

Since the powder materials are supplied from the auxiliary lance along the flow of gas within the furnace, the downward jetting velocity can be smaller than in the case of carrying out supply through furnace wall openings. A velocity of 5-10 m/s suffices.

In FIG. 4, reference numeral 20 designates an auxiliary lance and 7 designates a feeder of the type illustrated in FIG. 1 including powder material and carrier gas supply systems.

While the furnace is relatively tall and the position at which the powder materials are fed is at the upper part thereof, it was learned that the supply yield is not much affected even when the residence time of the powder materials in the open space within the furnace is long, and all that need be done is to have the intersection point with the melt fall within the central ⅔ of the internal cross-sectional area of the furnace.

Since the supply of the powder materials can be carried out without immersion of the lance in the melt or the slag, the pressure in the powder supply tank and of the carrier gas need not be high, making it possible to use inexpensive equipment.

In the present invention, during blowing with top-blown gas, powder materials are supplied to the melt surface within an area extending from the furnace center toward the furnace wall by not more than ⅔ the furnace radius so as to take advantage of the furnace gas stream in the direction of the melt surface. There is thus no loss by scattering of the powder materials (entrainment by the gas being discharged into the off-gas duct) and it is possible to obtain a high supply yield.

Other aspects of the invention will now be explained.

Figure 5:
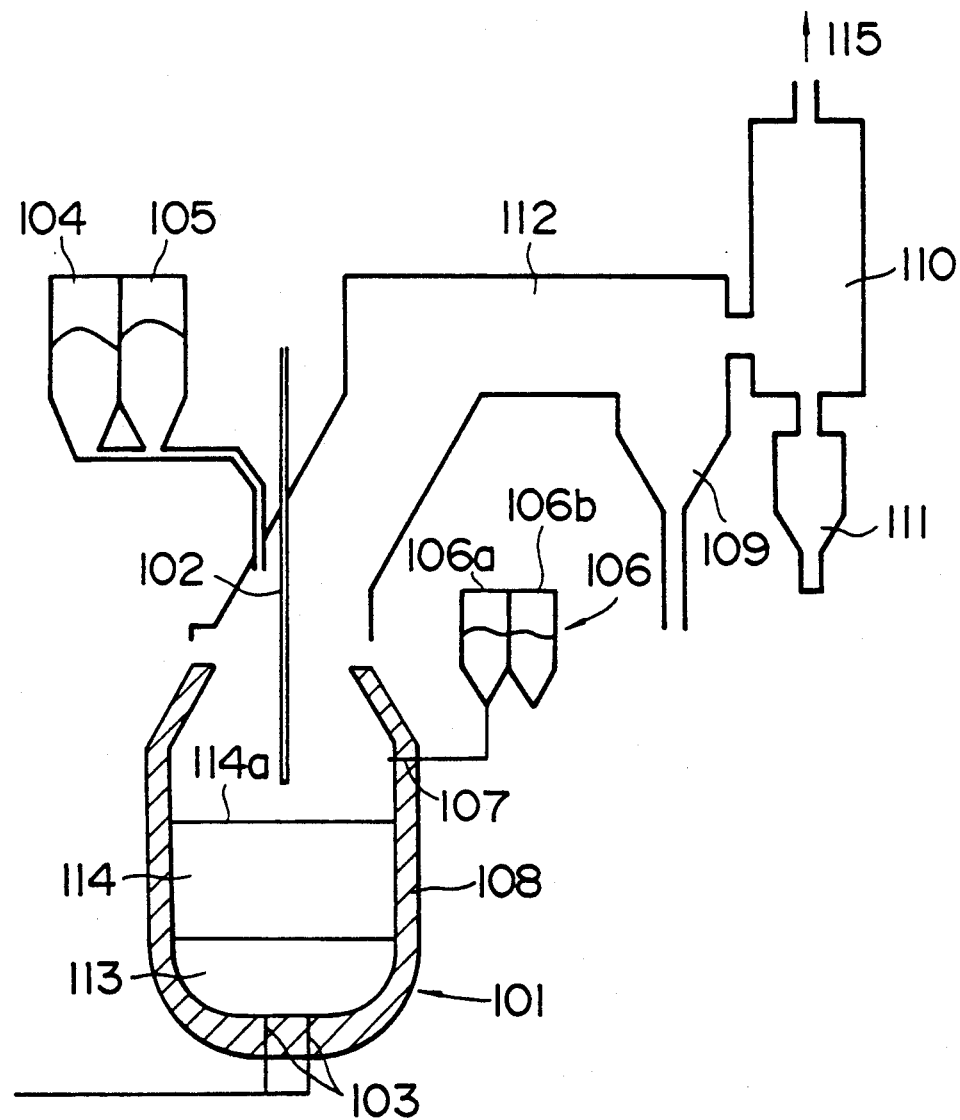
FIG. 5 is an explanatory sectional view of a system for implementing still another embodiment of the invention.

As shown in FIG. 5, in the operation of an in-bath smelting reduction furnace, a bath consisting of hot metal 113 and slag 114 are formed at the lower part of a furnace consisting of a furnace body 101 having a refractory lining 108. The temperature of the hot metal and slag is 1400°-1700° C. When iron ore is supplied into the furnace in this state, the iron oxides therein are melted and the molten iron oxides are then reduced by carbon materials present in the slag in the form of coke or char and by dissolved carbon in the hot metal, thus producing additional hot metal.

Ore can be supplied in different ways, such as by dropping from a hopper equipped above the furnace, by injection from the furnace side wall and by injection into the slag or hot metal. As a typically used method, FIG. 5 shows the case where the ore is supplied from a hopper 105 located above the furnace.

For compensation of the reduction heat and the sensible heat of the product, oxygen (oxygen-rich air or heated air will also suffice) is supplied to the hot metal and to the carbon materials in the slag in the furnace from a top lance 102. The supplied oxygen reacts with the coal and the dissolved carbon in the hot metal to produce heat. The gases generated by reaction of oxygen with carbon and coal also undergo combustion reaction, producing additional heat. The first-mentioned reaction is referred to as primary combustion and the latter reaction as post combustion.

Further, for promoting the melting and reduction reaction of the ore and heat transfer thereto, gas for agitation is supplied through tuyeres 103 at the bottom of the furnace. In view of the purpose of this gas agitation, there is no particular limitation on the kind of gas used. Ordinarily, nitrogen, argon, oxygen or a hydrocarbon such as propane is employed.

The supply of coal is carried out so as to maintain the carbon balance in the in-bath smelting reduction furnace substantially constant. The supply can be accomplished by the same methods as those usable for ore supply. As a typically used method, FIG. 5 shows the case where the coal is supplied from a hopper 104 located above the furnace.

During the operation of the in-bath smelting reduction furnace, ore and coal are continuously supplied from the hoppers 105 and 104, respectively, while oxygen is supplied by blowing from the top lance 102 in the direction of the bath. As a result, the supplied ore is melted and reduced to hot metal which settles to the lower part of the furnace.

The gas resulting from combustion of coal is recovered through an off-gas duct 112, the dust entrained by the gas is collected by a dust collector 109, and the remaining dust-free gas is used as reduction gas for pre-reduction of ore in a pre-reduction furnace 110 or as a fuel gas. The gas at this time contains a large amount of sensible heat which can advantageously be used for steam generation or the like.

As the operation of the in-bath smelting reduction furnace proceeds, hot metal and slag accumulate within the furnace and are therefore periodically tapped. Continuous operation is therefore possible.

Figure 6:
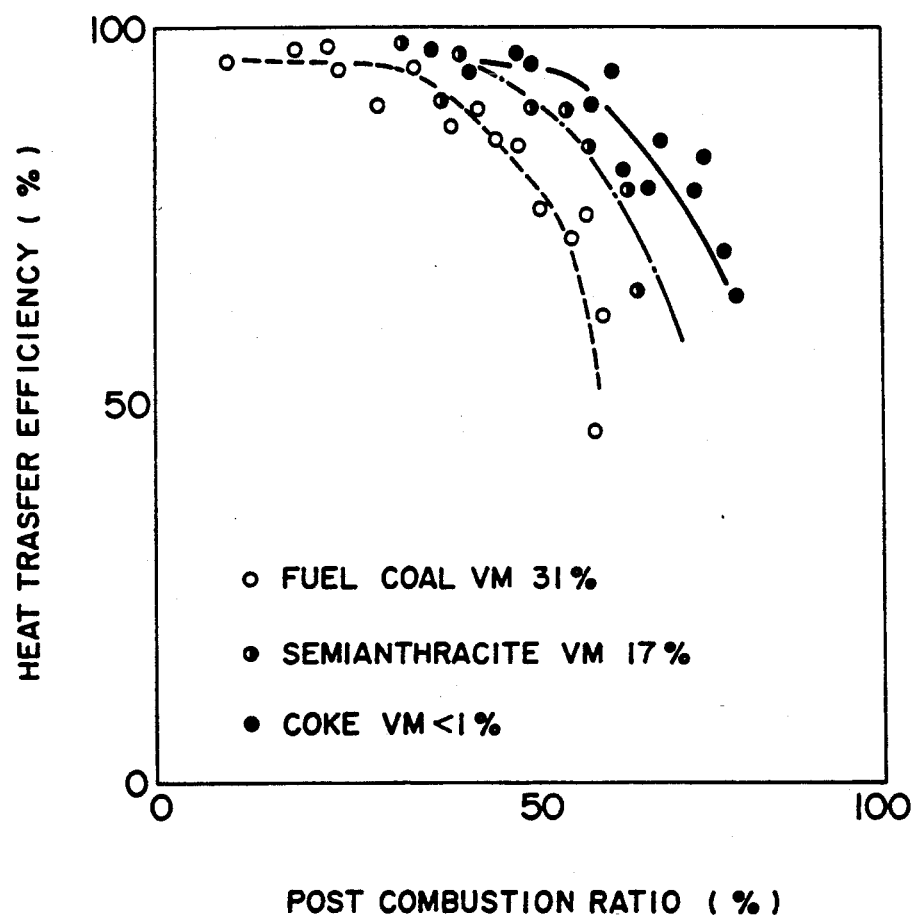
FIG. 6 is a graph showing the relationship between the heat transfer efficiency and the post combustion ratio.

FIG. 6 shows the relationship found between the post combustion ratio of the carbon materials used for in-bath smelting reduction and the heat transfer efficiency in a 100 ton experimental in-bath smelting reduction furnace.

In the experiment, operation was conducted using three types of carbon materials: (a) coke as a material containing no VM, (b) semianthracite coal containing 17% VM and (c) fuel coal containing 31% VM. As can be seen from FIG. 3, with VM-free coke the heat transfer efficiency was 90-95% up to a post combustion ratio of 60%, while with semianthracite coal the heat transfer begins to worsen from a post combustion ratio of about 45%.

FIG. 2 shows the results of a simulation of the flow and reaction of the gas in the in-bath smelting reduction furnace. Since the temperature in the vicinity of the furnace wall becomes high when operation is conducted under the same conditions of this simulation, the upper portion of the 100 ton furnace was lined with refractory consisting of $MgO$—$Cr_2O_3$, which is the refractory among those ordinarily used in ironmaking that exhibits the highest resistance to high temperature and which also has strong resistance to acidic gas atmosphere.

The experiment showed the rate of wear against in-bath smelting reduction furnace operational time to be a very high 2–5 mm/hr.

The highest gas temperature of over 2000° C. was measured near the wall in the upper furnace space and, moreover, there was a gas upflow in this region. The wear rate of the refractory was the highest at this portion.

As was mentioned earlier, the gas flow in the upper furnace space constitutes an upflow with a region extending from the furnace wall up to ⅓ the distance to the furnace center and a downflow in the region extending ⅔ the distance between the center and the wall.

In this example, therefore, the powder materials were upwardly injected into the furnace gas inward from the furnace wall by less than ⅓ the distance between the furnace wall and the center.

In the operation of the in-bath smelting reduction furnace, a high post combustion ratio was obtained by mixing char (carbonized coal) produced by a method to be described later with the coal so as to reduce the average VM of the carbon materials used. In this case, while it is preferable to use a post combustion ratio of 40–50%, operation could also be conducted at post combustion ratios exceeding 50%.

Since the post combustion ratio was high, the gas temperature at the top of the in-bath smelting reduction furnace became 2000° C. and higher. So as to effectively utilize the sensible heat of this high-temperature gas, slack, powder ore, powder limestone and other such powder materials were injected into this portion (the upper space of the furnace) from a powder supply tank 106 via powder injection nozzles 107 (only one shown), whereby the powder materials were heated by the high-temperature gas and caused to react. As a result, the gas could be cooled.

The effect was particularly large when the powder material was slack. When the slack came in contact with the high-temperature gas, it was carbonized and at the same time the gas was reformed, the reaction at this time causing a pronounced reduction in the gas temperature.

An embodiment relating to the injection of slack will be discussed.

FIG. 7 is an enlarged view of one part of FIG. 5.

The injection nozzle is illustrated schematically in FIG. 8. The arrow in this figure indicates the direction of slack jetting. Reference numeral 107 designates an injection nozzle and 116 designates a port.

The symbol $\theta$ appearing in FIG. 7 indicates the angle between the axis $x_1$ of the port 116 and a line $x_2$ lying parallel to the furnace wall and thus indicates the jetting angle of the slack with respect to the furnace wall.

The injected slack is rapidly heated by the high-temperature gas and VM of the slack is gasified quickly. The gasification rate of VM varies depending on the particle diameter of the slack. When the particles are smaller than a certain size, VM separation also becomes rapid owing to the rapid heat conductance so that the VM separation is completed in as short a time as 0.2–2 sec. The reason for the limitation of the particle diameter of the slack will be explained later.

The VM is released as a gas consisting of hydrocarbons, carbon monoxide and hydrogen. At the high temperatures of over 2000° C. present in the in-bath smelting reduction furnace in the present invention, differently from the case of a coke oven or other coal carbonization furnace, there is observed almost no generation of tar so that this invention enjoys the advantage of not requiring treating of tar. Immediately after the VM is released from the coal, the resulting gas reacts with the high-temperature gas having a relatively high oxidation degree generated from the furnace. Among the gases generated from the coal, it is the hydrocarbons which react with the gas from the in-bath smelting reduction furnace. The hydrocarbons give rise to a reforming reaction with the carbon dioxide and steam in the generated gas, decomposing them into hydrogen and carbon monoxide.

Specifically, there occurs an endothermal reaction according to the example shown by the following formula, whereby the average temperature of the gas in the furnace is reduced.

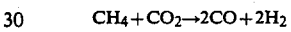

$$CH_4 + CO_2 \rightarrow 2CO + 2H_2$$

In other words, it is possible to use the sensible heat of the gas generated by the in-bath smelting reduction furnace for the coal carbonization and the gas reforming reaction, whereby the heat can be recovered and the gas in the furnace can be cooled.

An example in accordance with the foregoing, of the operation of a 100 ton in-bath smelting reduction furnace will be explained.

First the in-bath smelting reduction furnace was continuously supplied with pre-reduced ore as an iron source and a mixture of fuel coal and char obtained by carbonization of fuel coal. As fluxes for regulating the slag composition, the furnace was supplied with burnt lime as mixed with pre-reduced ore. All of the oxygen was supplied through the top lance, while nitrogen gas was supplied through the tuyeres in the bottom of the furnace for agitation of the metal and slag baths.

The operation of the in-bath smelting reduction furnace was conducted with relatively high post combustion, the post combustion ratio being 47.6%, and the generated gas flow rate at this time was 57,900 $Nm^3/H$. Slack was injected into the furnace from the powder supply tank 106 through the powder injection nozzles 107. A total of eight powder injection nozzles 107 were disposed in the circumferential direction at a height of about 1 m above the slag surface.

The shape of the powder injection nozzles 107 is illustrated in FIG. 8(b). Based on the results of the analysis of the gas flow within the furnace indicated in the distribution pattern referred to earlier, the scattering (entrainment) of the slack was promoted by carrying out the injection vertically upward in a fan-shaped pattern directed parallel to the furnace wall, namely with the aforesaid angle $\theta$ being zero.

Under these operating conditions, the particle diameter of the injected slack was adjusted to be not more than 2 mm, which is smaller than the gas-entrainable diameter of the slack. The slack was carbonized in the furnace and the off-gas duct, to have its VM greatly reduced. As is shown in Table 2, the carbon dust collected by the dust collector at the outlet of the off-gas duct contained almost no VM. In other words, the injected slack was adequately carbonized and converted to char containing almost no VM.

The gas reforming effect of the VM generated as a result of the injection of the slack was estimated by comparing gas sampled within the furnace with gas sampled at the outlet of the off-gas duct. The results are shown in Table 3.

While the oxidation degree of the gas in the furnace was 0.476, that of the gas at the off-gas outlet was found to be reduced to 0.345 as a result of reaction of the slack VM with the carbon dioxide and steam in the gas. It was thus clarified that the generated gas was reformed to an oxidation degree suitable for pre-reduction of iron ore. Moreover, no methane, ethane or other hydrocarbons were detected in the gas sampled at the outlet of the off-gas duct. From this, it was clear that the reaction between the off-gas and the VM was substantially completed within the off-gas duct.

The temperature of the gas during the operation was also measured. Specifically, the temperature of the gas in the vicinity of the refractory at the top of the furnace and that of gas at the outlet of the off-gas duct were determined. Further, for comparison, the in-bath smelting reduction furnace was operated under substantially the same conditions but in the conventional manner without injection of slack. The temperatures observed in this case are also shown in Table 1.

As can be seen from Table 1, even when the in-bath smelting reduction furnace is operated under approximately the same conditions, the gas temperatures in the furnace and at the outlet of the off-gas duct are found to differ between the method of this invention and the conventional method. When the operation is conducted with injection of slack and reforming of ga according to the present invention, the average gas temperature in the furnace is about 110° C. lower while the gas temperature at the off-gas duct outlet is about 160° C. lower.

What this means is that the heat for carbonization of the injected slack and the heat absorbed by the gas reforming reaction was supplied from the sensible heat of the gas.

TABLE 2-continued

| Item | Description of material |
| --- | --- |
| Coal[1] (Lump) | Mixture of 80% fuel coal (FC 55.3% VM 31.9% Ash 11.6%) and 20% char (FC 81.0% VM 1.8% Ash 13.6%) |
| Slack[2] | Fuel coal (same composition as above), all adjusted to particle diameter of not more than 2 mm |
| Carbon material captured by dust collector | FC 80.2% VM 2.2% Ash 14.4% |

[1]For supply to furnace. Supplied from hopper 104.
[2]For carbonization and gas reforming. Supplied from powder supply tank 106.

TABLE 3

| | CO | $CO_2$ | $H_2$ | $H_2O$ | $N_2$ | Ar | Gas oxidation degree |
| --- | --- | --- | --- | --- | --- | --- | --- |
| Furnace gas (%) | 38.3 | 22.5 | 9.3 | 20.7 | 6.8 | 0.4 | 0.456 |
| Dust collector gas (%) | 44.9 | 18.0 | 16.5 | 14.4 | 5.9 | 0.3 | 0.345 |

It is important in operation according to the present invention that the slack be carbonized at high efficiency, and studies conducted by the inventors revealed that the carbonization rate is strongly affected by the slack particle diameter. Regarding the particle diameter of the slack used for gas reforming, the first condition required for enabling this aspect of the present invention to be employed with good effect is that the slack should preferably be entrained by the generated gas to be blown from the interior of the furnace to the off-gas duct, thus ensuring adequate contact time between the gas and the slack. The slack particle diameter and the injection conditions were set to satisfy this condition in Example 1.

Specifically, when the particle diameter of the injected slack is such that it is entrained by the upflow of generated gas, the slack travels through the duct together with the high-temperature gas, with the result that the contact time between the slack and the high-temperature gas increases and the slack carbonizes more readily.

The inventors first discovered that a relationship exists between the slack particle diameter and the gas reforming effect. They also ascertained that in the ex-

TABLE 1

| Item | Conventional method (Comparison) | Invention (Example 1) |
| --- | --- | --- |
| Hot metal temp. (°C.) | 1470 | 1465 |
| Hot metal weight (t) | 102 | 110 |
| Slag weight (t) | 41 | 38 |
| Bottom bubbled gas (Nm³/hr) | $N_2$ 1800 | $N_2$ 1800 |
| Oxygen flow rate (Nm³hr) | All top blown 25000 | All top blown 25000 |
| Hot metal production (t/hr) | 43 | 45 |
| Generated gas flow rate (Nm³/hr) | 59000 | 57900 |
| Post combustion ratio (%) | 45.1 | 47.6 |
| Slack injection rate (kg/hr) | — | 5060 |
| Average gas temperature in furnace (°C.) | 1860 | 1745 |
| Gas temperature at off-gas duct outlet (°C.) | 1180 | 1020 |

TABLE 2

| Item | Description of material |
| --- | --- |
| Ore | Pre-reduced ore was used T. Fe 71.1% Pre-reduction ratio 33.4% | periments in which good gas reforming efficiency was achieved, the dust in the off-gas had a larger amount of powdery char mixed in with it. They therefore conducted experiments for ascertaining the relationship between gas-entrainability of the slack and gas reforming effect. The results are shown in Table 4.

TABLE 4

Experiment conditions:
Off-gas flow rate - 57300 Nm³/hr, Slack injection rate - 11.0 t/hr, Theoretical reduction of gas oxidation degree - 12.8%

| | Slack particle diameter (mm) | Dust collector carbon material capture rate (%) | Gas oxidation degree reduction (%) | Gas reforming effect *) (%) |
| --- | --- | --- | --- | --- |
| Test A | <1.0 | 89.5 | 11.9 | 93.0 |
| Test B | 1.2–2.0 | 28.9 | 7.5 | 58.6 |

*) (Actual gas oxidation degree reduction) / (Theoretical gas oxidation degree reduction)

From this it can be seen that small diameter slack particles with high gas-entrainability enable more efficient gas reforming.

Therefore, so as to be able to predict slack gas-entrainability, the inventors compared the upward force the slack particles receive from the gas with their weight. As a result, they discovered that the following relationship holds.

It is preferable for the particle diameter of the slack to be smaller than that obtained by Eq. 1 below, namely to be smaller than the particle diameter at which the velocity of the off-gas in the off-gas duct and the terminal velocity of sedimentation (the falling velocity after an infinite period of time when the slack particles fall freely in the gas) are equal:

$$u = (4\, g^2\, D_{p3}/225\, \mu p)^{\frac{1}{2}} \quad (1)$$

where
$u$: terminal velocity of sedimentation
$\mu$: gas viscosity
$D_p$: particle diameter
$p_g$: gas density
$p_p$: slack density The apparent density of coal (slack) being 1.3–1.6, the condition is determined by the value obtained when this value is substituted into Eq. (2). Moreover, calculating Dp using the properties of the gas at the furnace mouth at a temperature of 1800° C., there is obtained $$Dp = 0.47 \cdot V^{\frac{3}{2}} \quad (2)$$

(V: gas velocity within duct (m/sec))

If slack of a particle diameter smaller than this Dp is injected, the slack will be entrained by the gas and pass together therewith from the interior of the furnace through the duct, whereby carbonization and gas reforming will be effectively carried out.

Applying this equation to the experimental conditions shown in Table 4, we get V=4.0 m/s and Dp=1.2 mm. That is to say, in Test A the conditions were such that the slack was entrained while in Test B they were such that it was difficult for the slack to be entrained. This fact is clearly reflected in the difference between the slack entrainment rates.

It is necessary for the carbonization of the slack and the reaction with the gas to be completed within the off-gas duct where the temperature of the gas is high. In most facilities, the length of the off-gas duct for treating the generated gas is 15–30 m and the equipment is designed to achieve an off-gas flow velocity of 10–20 m/sec. Thus the residence time of the slack in the duct together with the gas is 1–2 seconds. In the present invention, therefore, it is a necessary condition that the particle diameter of the slack be prescribed such that the carbonization of the slack is completely finished in the off-gas duct. Specifically, the carbonization of the slack must be completed within about 2 seconds, which is approximately the time that the gas and the slack are in contact with each other between the interior of the furnace and the outlet of the off-gas duct.

A study conducted by the inventors revealed a strong dependence of the slack carbonization time on the particle diameter. The study conducted was aimed at determining the slack particle diameter which would enable carbonization to be completed within the duct and involved experiments in which slack was carbonized in high-temperature gas. The results obtained are shown in Table 5.

As slack carbonization is controlled by the heat conduction, the carbonization time was shorter in the case of fine slack which could be rapidly heated to the interior. It was thus found that for ensuring carbonization to a residual VM of 2% in about 2 seconds it suffices for the particle size of the slack to be 2 mm or less.

TABLE 5

Experimental conditions:
Fuel coals of prescribed particle diameters were charged into an electric furnace having a 1400° C. nitrogen gas atmosphere and the composition of the coal after two seconds was examined.

| Coal particle diameter (mm) | 1.0 | 1.5 | 2.0 | 2.7 | 3.5 | 5.0 |
| --- | --- | --- | --- | --- | --- | --- |
| Residual VM (%) | 1.3 | 1.2 | 2.0 | 7.1 | 10.8 | 16.2 |

In the light of the foregoing facts, the inventors determined two important points for ensuring effective use of slack for gas reforming in the present invention: (a) the slack should pass upward through the off-gas duct entrained by the gas and (b) the particle diameter of the slack should be small enough for the reaction to be completed within the duct.

Further, for obtaining a refractory protecting effect by the injection of slack into the in-bath smelting reduction furnace, the slack has to be injected into the furnace and has to be injected at a part of the furnace where the gas is rising. Thus the particle size of the slack, the position of slack injection and the direction of injection are all important factors in obtaining a gas reforming effect.

That is to say, considering the results of the analysis of the gas flow inside the furnace, if the aim of the operation is to entrain the slack on the generated gas and carbonize it using the sensible heat of the gas, it is necessary to inject particles of an appropriate size into the gas upflow near the furnace wall.

Table 6 shows the results of an experiment conducted to determine how the gas reforming effect is influenced depending on the two conditions of whether the slack was entrained by the gas in the off-gas duct and whether or not the reaction of the slack was completed within the duct.

In Experiment 1 in Table 6, the slack was injected under conditions that enabled it to be entrained by the upflow of gas and the slack used had a particle diameter of 1.2 mm or less, which is a particle diameter at which the terminal sedimentation velocity was slower than the flow rate of the off-gas. In Comparison 2, on the other hand, the same nozzle was used to inject slack which had a particle diameter of 1.5–2 mm (i.e. larger than Dp) and was thus difficult to entrain.

While in Experiment 1 the entrainment rate exceeded 90% and the gas reforming effect was large, in Comparison 2 the entrainment rate was only about 50% and the gas reforming effect was also only about 50%, from which it will be understood that effective slack carbonization and gas reforming could not be realized.

This is why in the present invention the particle diameter of the injected slack is specified either to be smaller than 2 mm or to be smaller than the diameter of the largest particles which can be entrained at the gas flow rate in the gas duct.

The slack injection position and injection conditions are also important factors in the present invention.

As seen in FIG. 2 which was referred to earlier, the gas flow is not uniform within the furnace. The center region of the furnace is affected by the oxygen gas jet from the top lance, which creates a downflow in this region. On the other hand, the generated gas rises along the furnace wall.

As can be seen in FIG. 2, the boundary between the upflow and downflow falls at a distance from the furnace center equal to ⅔ the distance between the center and the furnace wall (hereinafter called the "⅔ boundary"). Moreover, in such a furnace wherein an upflow and a downflow are produced, the strongest upflow (of 10 ms/ or higher) occurs at a height of about 1.5 times the furnace radius above the slag surface 114a (FIG. 5).

In view of the results of this gas flow simulation, experiments were conducted to compare the difference between the cases where slack is injected from a nozzle into the 10 m/s or higher velocity upflow on the wall side of the ⅔ boundary and the case where slack is injected into the region on the center side of the ⅔ boundary.

The nozzle used in Experiment 1 referred to in Table 6 was the denoted as nozzle 107a in FIG. 8(a) and the angle θ with resect to the furnace wall was 10° (this combination of nozzle and angle θ being hereinafter referred to as "injection nozzle A"). The injection of slack with the injection nozzle A was conducted up to 430 mm from the wall at the furnace mouth. Since the inner diameter of the furnace mouth was 3 m, injection in this manner satisfied the aforesaid requirement of the invention for injection into the gas upflow.

The nozzle used in Experiment 2 referred to in the same table was that denoted as 107b in FIG. 8(b) and the angle θ with respect to the furnace wall was 0° (this combination of nozzle and angle θ being hereinafter referred to as "injection nozzle B"). The injection of slack was conducted at 100 mm from the furnace mouth, in parallel with the furnace wall and in a fan-like pattern over an angle 180°. As in Experiment 1, the injection conditions in Experiment 2 also satisfied the requirements of the present invention.

The nozzle used in Comparison 1 was that denoted as nozzle 107 in FIG. 8(c) and the angle θ with respect to the furnace wall was set at 18° so that injection could be made at a point 800 mm from the furnace wall (this combination of nozzle and angle θ being hereinafter referred to as "injection nozzle C"). This Comparison 1 did not satisfy the requirement of the invention for injection on the wall side of the ⅔ boundary.

As will be noted in Table 6, the ratio of slack collection by the dust collector of the off-gas duct was greater than 90% in the case of injection using nozzles A and B but was only a low 70% in the case of injection using nozzle C and, moreover, the gas reforming effect was also inadequate.

From the foregoing it will be understood why the present invention limits the region for injection of the slack for gas reforming to that extending inward from the furnace wall by a distance equal to ⅓ the distance between furnace center and the furnace wall.

In Experiment 3 referred to in Table 6 the velocity of the gas within the off-gas duct was increased to such level that slack particles of diameters too large to complete reaction within the off-gas duct were also entrained by the generated gas. In this case, although the slack particles were entrained by the generated gas, gas reforming did not progress sufficiently so that the gas reforming effect was held to around 70%.

TABLE 6

Experiment Conditions:
Experiment 1 - Comparison 2: Gas velocity in off-gas duct - 4.0 m/s Dp = 1.2 mm
Comparison 3: Gas velocity in off-gas duct - 14.2 m/s Dp = 2.8 mm

| | | Slack particle diameter (mm) | Angle θ (°) between port and wall | Slack collection rate at dust collector (%) | Gas reforming effect *) (%) |
|---|---|---|---|---|---|
| Experiment 1 | Injection nozzle (A) | <1.2 | 10 | 93.2 | 97.0 |
| Experiment 2 | Injection nozzle (B) | <1.2 | 0 | 91.1 | 91.9 |
| Comparison 1 | Injection nozzle (C) | <1.2 | 18 | 73.0 | 59.4 |
| Comparison 2 | Injection nozzle (A) | 1.5–2 | 10 | 47.8 | 51.1 |
| Comparison 3 | Injection nozzle (A) | 2.0–2.8 | 10 | 89.3 | 72.9 |

*) Ratio of change in gas oxidation degree presuming contribution to gas reforming by entire VM content of injected slack to actual gas oxidation degree The inventors also experimented with a number of other nozzle shapes aside from those used in Experiments 1 and 2, through which they learned that insofar as the slack is entrained on the gas in accordance with the requirements of this invention mentioned in the foregoing, little difference can be noted depending on the nozzle shape. The invention was also worked using a furnace lacking the upper cone section of the furnace shown in FIG. 7. In this case too, it was found that the gas reforming effect was adequate insofar as the requirements of this invention were satisfied.

When the gas obtained according to this invention was used to carry out pre-reduction of iron ore in a single-stage fluidized bed pre-reduction furnace, high efficiency operation could be realized thanks to the reduced oxidation degree of the gas. The results obtained are summarized in Table 9, which shows that while the pre-reduction ratio in the case of high post combustion operation according to Conventional Method 2 was 9%, in the case of operation according to the present invention the pre-reduction ratio was boosted to as high as 40% notwithstanding that the in-bath smelting reduction furnace was similarly operated at high post combustion.

The gas obtained by reforming the gas according to the present invention generally has a temperature of 1100°-1300° C. and thus satisfies the requirement for a gas temperature of higher than around 1000° C. at the inlet of the pre-reduction furnace. It thus need be subjected only to the simple operation of mixing a small amount of cooling gas therewith and does not require any reheating.

This means that in carrying out pre-reduction according to this invention there is no need for large-scale cooling or reheating, and that even when the pre-reduction furnace and the in-bath smelting reduction furnace are directly interconnected, it is still possible to realize good compatibility between high-efficiency pre-reduction operation and operation of the in-bath smelting reduction at a high post combustion ratio.

Explanation will now be made regarding the case where powder materials other than coal (slack) are injected.

The operation for injection of powder ore will be taken up first When the injection nozzle 107a shown in FIG. 8(a) was used to inject powder ore, the powder ore was found to fluidize along the furnace wall and thus to shield the wall from radiant heat from the furnace gas and lower the amount of heat input to the furnace wall. For confirming this effect, powder ore was injected parallel to the furnace wall at 400 kg/min and the heat input to the furnace wall was measured using a heat flux meter imbedded in the furnace wall refractory.

Figure 10:
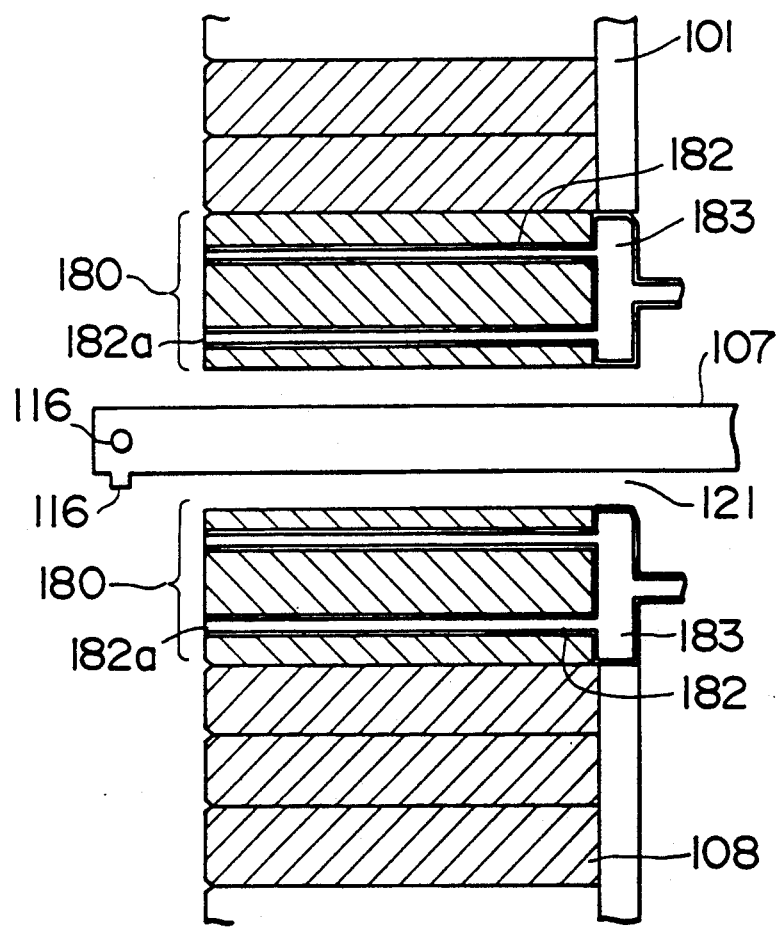
FIG. 10 is a sectional side view showing an example of the refractory cooling structure in the vicinity of the injection nozzle.

As a result, it was found that the amount of input heat fell dramatically from 19,600 kcal/m²·hr without injection of powder ore to 11,000 kcal/m²·hr with injection of powder ore. As shown in FIG. 10 to be discussed in detail later, the gas temperature in the vicinity of the furnace wall was observed to be 115° C. lower in the case where powder ore was injected than in the case that it was not. The superior effect of this type of operation could be seen from, for example, the fact that the injection of the powder ore approximately halved the refractory wear rate.

An effect similar to that realized by the aforesaid injection of ore could also be obtained in the case where powder limestone was injected instead of slack or powder ore at the rate of 150 kg/min per nozzle.

An explanation will now be given on the injection nozzles usable for efficient injection of the powder materials under the aforesaid conditions.

The injection nozzles are subjected to extremely harsh operating conditions, specifically to severe abrasive action of the powder and exposure to high-temperature gas in the furnace. As a result, they wear rapidly and require frequent replacement.

Frequent nozzle replacement leads to reduced operating rate and various other problems since the refractory surrounding the nozzles is apt to be damaged during the replacement work and, at any rate, the furnace has to be cooled before the replacement work can be carried out.

Figure 9:
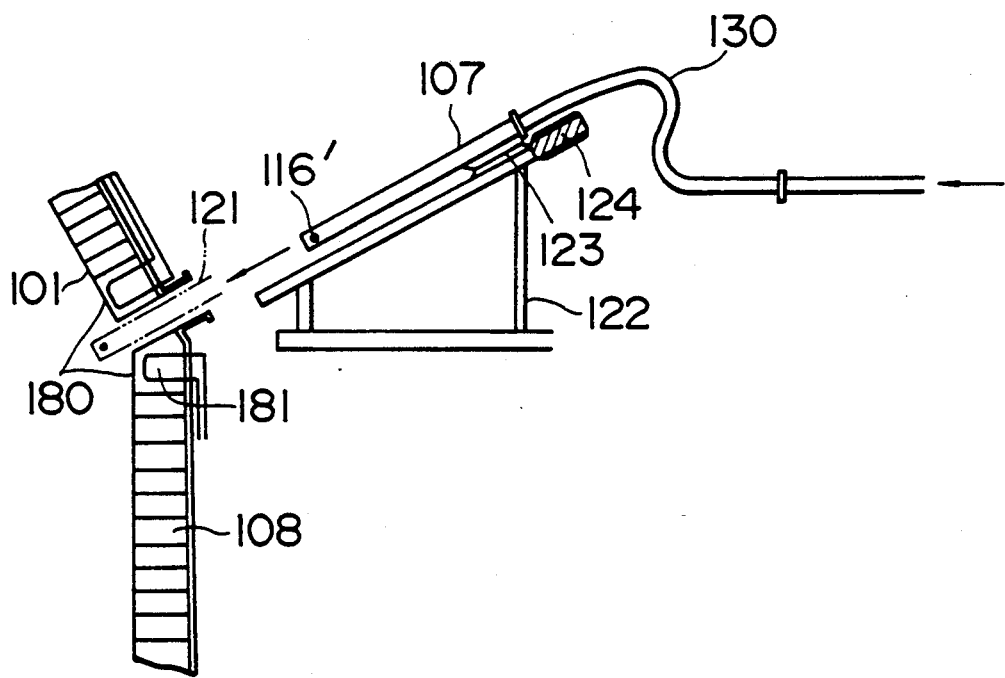
FIG. 9 is a structural view of an example of an insertable and retractable injection nozzle.

As shown in FIG. 9, in this invention these problems are overcome by installing each powder injection nozzle 107 so as to be insertable through and retractable from an opening 121 provided in the refractory lining 108 at an upper portion of the furnace wall.

For advancing and retracting the powder injection nozzles 107, it is possible, for example, to dispose a frame 122 in the vicinity of the opening 121, support the powder injection nozzle 107 on a dolly 123 free to travel along the frame 122, and link the dolly 123 with a drive device 124 constituted of a hydraulic, pneumatic or electrically driven cylinder or a driving motor. Reference numeral 130 in FIG. 9 designates a flexible hose.

The refractory 180 surrounding the opening 121 through which the powder injection nozzles 107 are passed is provided with an embedded cooling plate 181 or a cooling pipe (no&. shown) through which a coolant such as water, gas-liquid mixture, compressed air or the like is passed. Alternatively, while not shown in the figure, the furnace body (steel shell) 101 can be provided with a cooling structure for cooling refractory 180.

Owing to the provision of such a structure, the powder injection nozzles 107 need be inserted through the furnace body 101 only during operation and can be retracted to a standby position apart from the high-temperature furnace body 101 when the furnace is not in operation. Moreover, replacement of worn powder injection nozzles 107 is possible without cooling of the furnace and the service life of the refractory 180 is greatly lengthened so that the operating rate can be dramatically increased.

One example of the aforesaid cooling structure is shown in FIG. 10. The illustrated structure is constituted of a plurality of coolant jet tubes 182 embedded in the furnace body 101 and each having an opening 182a at the inner side of the furnace. This arrangement provides excellent effects.

In operation, coolant injected through header members 183 passes through the coolant jet tubes 182 and is jetted from the opening 182a situated on the inner wall surface of the furnace and, as a result, the refractory 180 in the vicinity of the powder injection nozzles 107 is subjected to strong cooling.

Moreover, if oxygen gas is added to the aforesaid coolant, there can be obtained a secondary effect of inhibiting the adherence of slag and the like in the vicinity of the opening 121. Since the coolant is jetted into the interior of the furnace in this case, it is preferable to use as the coolant nitrogen gas, carbon dioxide gas, the gas generated by the in-bath smelting reduction furnace after it has once been cooled, or mist obtained by adding an appropriate amount of water to compressed air.

In the in-bath smelting reduction operation according to this example, in carrying out the injection of slack no need arises for complex and large-scale equipment for cooling, removing the carbonic acid and reheating the generated gas. Moreover, since the gas is reformed in the off-gas duct, the equipment and operating costs are low, a high degree of pre-reduction can be realized at low cost, and the operation can be conducted at high post combustion.

Furthermore, in the conventional method of leading the gas generated in the in-bath smelting furnace directly to the pre-reduction furnace without cooling, it has been impossible to solve the problem of both increasing in heat generation in the in-bath smelting reduction furnace due to high post combustion and reducing the amount of heat consumed in the smelting reduction furnace to increase the pre-reduction ratio. However, it has been easy to solve that problem with this invention. As a result, the unit consumption of coal is reduced to a level on a par with those of the coke oven-blast furnace process.

In the in-bath smelting reduction method according to this invention, since it is possible to use cheap fuel coal which is not usable in the coke oven-blast furnace processes and also since there is no need for pre-treatment of the coal or ore, it is possible to achieve a unit consumption of coal on a par with that of the blast furnace method and, accordingly, it is possible to realize a reduction in hot metal production cost of about 10-20% relative to that in the blast furnace method.

In addition, since the temperature of the smelting reduction furnace gas is lower, the service life of the furnace refractory is prolonged, thus reducing refractory related costs. The interval between refractory repair operations is also increased. In the method according to Comparison 2 explained earlier, for example, operation could be continued for only about 15 days, while according to the present invention continuous operation for more than two months was possible. There was thus realized a 20% or greater improvement in operating rate and a substantial reduction in repair costs.

The method according to this invention for the injection of powder ore also made it possible to reduce the gas temperature in the vicinity of the furnace wall and thus greatly extend the service life of the refractory. At the same time, since the powder ore could be partially reduced, improvements in the unit consumption of coal and oxygen were also realized.

Next an explanation will be made regarding the individual techniques according to the present invention, namely the techniques of separately injecting powder materials into the upflow and downflow within the furnace and the effects obtained thereby.

In actual operation, it is possible to supply slack to the upflow region on the wall side of the furnace for the purpose of protecting the refractory and reforming the generated gas while simultaneously injecting powder ore toward the downflow region for the purpose of supplying the powder ore to the furnace at high yield. In this case, separate nozzles (nozzle groups) are provided for the supply of slack and powder ore so as to enable each to be selectively supplied through injection.

Further, by incorporating a cooling structure in the refractory structure at the upper part of the furnace, in cases where there is no need to protect the furnace wall or to reform the off gas, it becomes possible to mix the slack and the powder ore in a powder supply tank or in a supply pipe immediately upstream of the injection nozzles, and for supplying them to the interior of the furnace at high yield to inject them in the direction of the downflow region from the same nozzles.

On the contrary, where it is desired to reform the gas and use the reformed gas for pre-reducing powder ore in the off-gas duct, this can be realized by injecting slack and powder ore in the direction of the upflow region from the same nozzles.

Where it is desired to supply powder ore and slack in the same direction, if it should be found difficult to inject both from the same nozzles, it is possible to carry out the injection using separate powder ore nozzles and slack nozzles.

EXAMPLE 1.

The operation method according to the present invention was carried out in the course of top blowing during refining of steel in a 170 t converter. The inner diameter of the converter was 5 m and the rate of oxygen supply from the top was 30,000 m$^3$/hr.

This example relates to operation in which ore is supplied during blowing as a cooling material. In place of the lump ore supplied during operation by the conventional method, in the example ore having the particle size distribution shown in Table 7 was supplied in accordance with this invention.

TABLE 7

| Particle diameter (mm) | >3 | ~2 | ~1 | ~0.5 | ~0.125 | <0.125 |
|---|---|---|---|---|---|---|
| Weight ratio (%) | 0.1 | 7.9 | 8.8 | 4.9 | 14.9 | 68.4 |

The supply conditions were as follows:

| | |
|---|---|
| Carrier gas: | N$_2$ |
| Carrier gas flow rate: | 2000–4000 Nm$^3$/h |
| Injection rate: | 800 kg/min |
| Nozzle diameter: | 80 mm$\phi$ |
| Solid/gas ratio: | 9.6–19 |

Since in a furnace of this diameter the maximum gas flow rate in the vicinity of the furnace wall reaches about 30 m/s, the ore supply rate in this example was controlled to a jetting velocity of 35 m/s at the tip of the supply devices by adjusting the flow rate of the carrier gas.

As the powder ore supply rate was set at 800 kg/min, the solid/gas ratio varied between about 10 and 20.

As the supply device, a nozzle 80 mm in diameter was inserted through an aperture provided in the furnace shoulder and arranged so that it could be varied in direction between vertical and horizontal. The angle of the nozzle was changed slightly for each charge and the relationship between the powder material (powder ore) supply angle and the supply yield was investigated.

The supply yield was determined from the cooling effect resulting from the heat balance in the furnace.

Since lump ore unaffected by the furnace gas flow is used in the conventional method, it is possible to secure a supply yield of 90% or higher.

Figure 11:
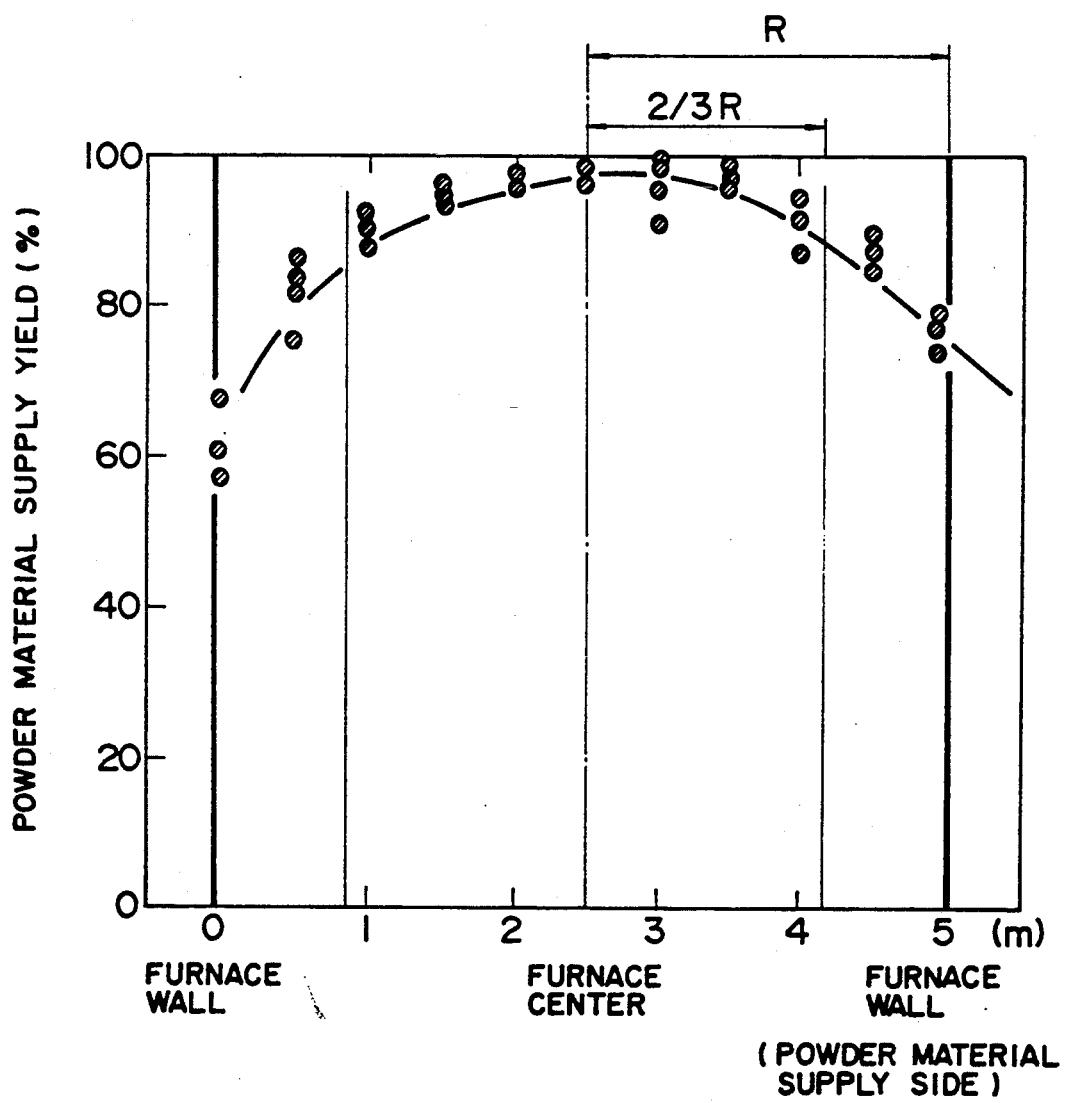
FIGS. 11 and 12 are graphs showing the powder material supply yield according to the invention.

On the other hand, a study of the supply yield in accordance with the method of this invention gave the results shown in FIG. 11. As will be noted from this figure, the supply yield was checked for 11 angles of injection ranging between vertically downward and substantially horizontal in the direction of the opposite wall.

When the supply was conducted within the region extending from the furnace center by ⅔ the furnace radius, there was obtained a high yield of 85% or higher, not substantially differing from that according to the conventional method of supplying lump ore.

EXAMPLE 2

A converter of the same type as that in Example 1 was used and supply of slack, when conducted, was carried out in accordance with the present invention. The rate of oxygen supply from the top was 30,000 m$^3$/hr.

TABLE 8

| Particle diameter (mm) | >5 | ~3 | ~1 | ~0.5 | ~0.25 | 0.25 ~ 0 |
|---|---|---|---|---|---|---|
| Weight ratio (%) | 0.2 | 6.7 | 46 | 18.5 | 12.1 | 16.5 |

In the conventional method, carbon materials such as lump coke and coal are supplied during converter blowing to supplement the heat source. On the other hand, in this aspect of the present invention the powdered carbon material shown in Table 8 was supplied as a supplementary heat source. The supply conditions were as follows:

| Carrier gas: | $N_2$ |
|---|---|
| Carrier gas flow rate: | 800–2000 $Nm^3/h$ |
| Injection rate: | 400 kg/min |
| Nozzle diameter: | 50 mm$\phi$ |
| Solid/gas ratio: | 9.6–24 |

A supply device having a nozzle tip that could be varied in injection angle between substantially vertically downward and horizontal was used and the supply yield was investigated at six different injection angles.

Figure 12:
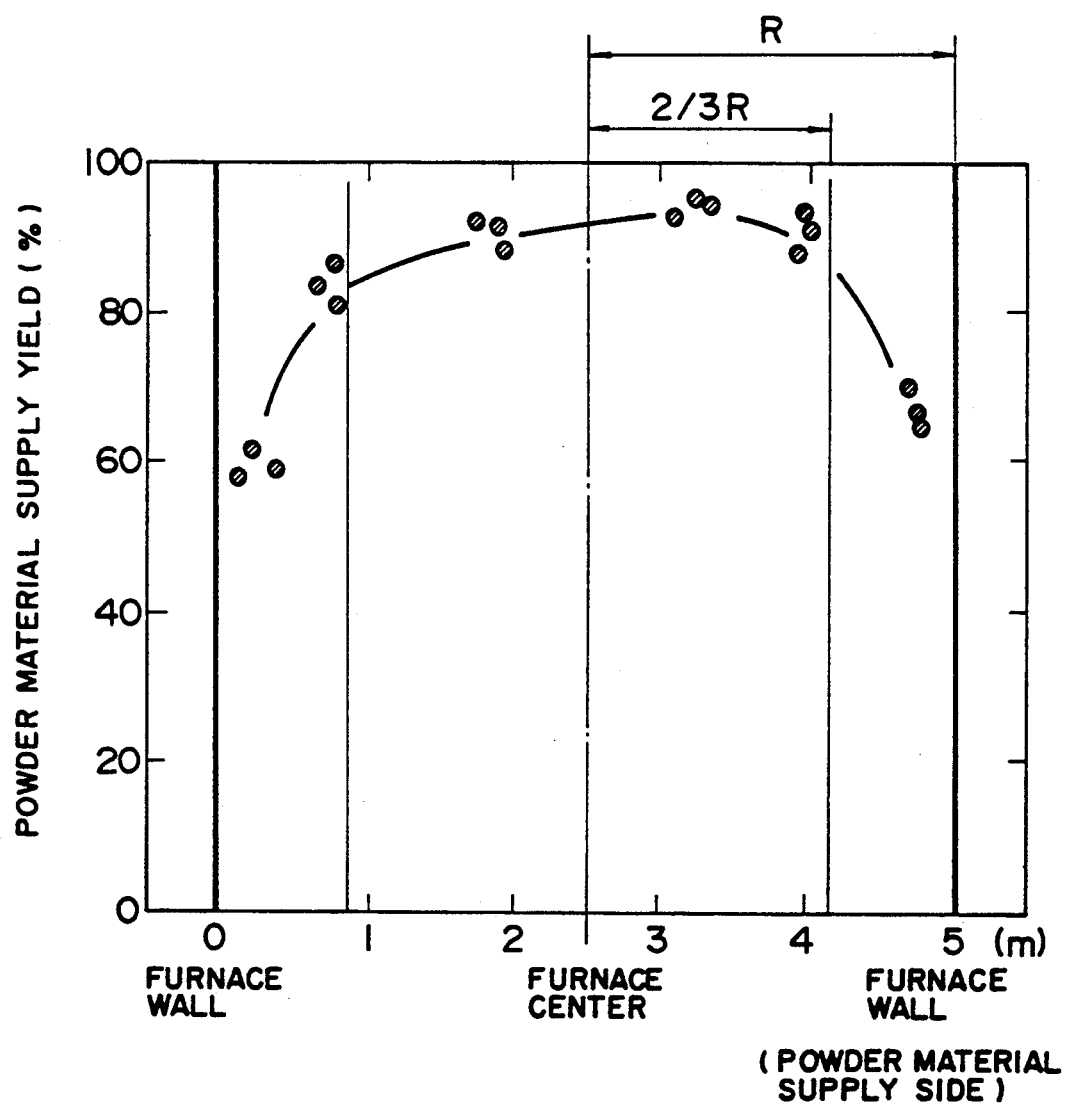

The results obtained are shown in FIG. 12.

The supply yield was calculated from the amount of the carbon material trapped in the furnace, which in turn was derived with high precision from the C balance calculated from data on the amount of heat generated from the supplied carbon material, the amount of carbon material in the off-gas dust, the C content (CO, $CO_2$ etc.) of the off-gas and the like.

In the conventional method of supplying lump carbon material, the supply yield is 90% or higher.

On the other hand, by the method of the present invention the supply yield was 85% or higher when the slack was supplied to the region extending from the furnace center by $\frac{2}{3}$ the furnace radius, meaning that it was possible to achieve a supply yield substantially the same as that in the case of lump material.

The bulk density of powder ore is generally 2.82 g/cm$^3$ and that of slack is 0.85 g/cm$^3$. In Example 1 and Example 2, however, it was possible according to the present invention to attain a very high supply yield notwithstanding that the bulk densities of the slack and powder ore differed greatly from the aforesaid values.

The materials supplied to the melt reaction vessel in the iron and steelmaking process and the melt producing process are, for example, iron ore, manganese ore, coke, coal, lime, dolomite and the like and the bulk densities of these materials in their powdered form fall almost entirely with the range of 0.7–3 g/cm$^3$.

Thus from Examples 1 and 2 it will be understood that the present invention can be applied to all of these materials.

EXAMPLE 3

The present invention was implemented in an integrated plant wherein the in-bath smelting reduction furnace and the pre-reduction furnace were directly connected with each other.

The operation using slack was conducted in the manner shown in FIG. 5, with the iron source to be reduced in the in-bath smelting reduction furnace being ore obtained by partially reducing iron oxide in a pre-reduction furnace and with a mixture of fuel coal and char obtained from fuel coal in accordance with this invention being used as the carbon material. The gas generated by the in-bath smelting reduction furnace was reformed using slack and, in its high-temperature state, was fed to a fluidized bed pre-reduction furnace where it was used for partial reduction of ore.

Table 9 shows the results for the production of melt by in-bath smelting reduction of iron ore by a 100 t in-bath smelting reduction facility. In each of the three sets of operating conditions, the results were obtained with the same type of ore and coal at a hot metal temperature of 1500° C., saturated melt carbon content, and a slag basicity of 1.2–1.3.

For economical operation, the coal used was mixed with char produced during gas reforming and containing almost no VM. Moreover, by conducting slack carbonization and gas reforming, the operation was carried out at a post combustion ratio of about 50%, which is the upper limit at which wear of the refractory can be suppressed, and the gas which had been reduced in oxidation degree and temperature by the slack for gas reforming was used for effective pre-reduction.

TABLE 9

|  | Conventional Method 1 | Conventional Method 2 | Invention |
|---|---|---|---|
| Post combustion ratio (%) | 30.8 | 48.5 | 48.8 |
| Furnace gas temperature (°C.) | 1721 | 1911 | 1730 |
| Gas oxidation degree at pre-reduction furnace inlet | 0.308 | 0.485 | 0.368 |
| Coal for gas reforming (kg/t) | — | — | 136 |
| Ore pre-reduction ratio (%) | 41 | 9 | 40 |
| Overall productivity (t/hr) | 58 | 64 | 81 |
| Overall unit consumption of coal (kg/t) | 1015 | 905 | 791 |
| Oxygen unit consumption ($Nm^3/t$) | 747 | 622 | 490 |
| Refractory wear rate at upper part of furnace (mm/hr) | 0.9 | 3.2 | 0.8 |
| Refractory unit consumption (kg/t) | 2.1 | 5.7 | 2.0 |

Two comparative examples of the conventional method in which gas reforming with slack is not performed are presented, one conducted at a high post combustion ratio and the other conducted at a low post combustion ratio.

In the operation according to Conventional Method 1, since the in-bath smelting reduction furnace was operated at a low post combustion ratio, the gas temperature in the in-bath smelting reduction furnace rose only to about 1720° C. so the refractory wear rate was low. Moreover, since the gas oxidation degree at the inlet of the pre-reduction furnace was low, the ore pre-reduction ratio was high (41%). Since the post combustion ratio was low notwithstanding the high pre-reduction ratio, the amount of heat generated in the in-bath smelting reduction furnace during the operation was low, which resulted in poor productivity and high unit consumption of coal and oxygen. The method can thus be seen to be an uneconomical one for the production of hot metal.

In Conventional Method 2, since the operation was conducted at a high post combustion ratio, the gas temperature in the furnace rose to as high as 1910° C. As a result, the refractory wear rate at the upper part of the furnace was 3.2 mm, four times that in the other operation methods, and the refractory unit consumption thus became a poor 5.7 kg/t. The cost of hot metal production was thus increased, the facility operating rate was reduced by the increase in refractory repair work, and maintenance costs increased.

Further, since the post combustion ratio was high, the oxidation degree of the gas at the inlet of the pre-reduction furnace was high, with the result that the ore pre-reduction ratio was held to a low 9%. Thus as the post combustion ratio was high and the ore pre-reduction ratio low notwithstanding the large amount of heat generated in the furnace, the productivity did not increase appreciably, while the unit consumption of coal and oxygen was relatively high.

Differently from the conventional methods, it was possible for the example according to this invention to achieve both high post combustion and high pre-reduction as a result of the reforming of gas that was carried out in the in-bath smelting reduction furnace and the off-gas duct used for conveying the gas to the pre-reduction furnace. Furthermore, since the slack injection conditions were optimized, the slack was effectively carbonized and the sensible heat of the high-temperature gas generated by the smelting reduction furnace could be utilized to good effect, thus eliminating the need for any large-scale gas reforming equipment.

Since the sensible heat of the high-temperature gas discharged from the in-bath smelting reduction furnace could be used as the heat needed for coal carbonization and gas reforming, the operation could be conducted with low-cost cost equipment and advantageously from the view point of energy utilization.

As shown by the example, operation conducted in accordance with this invention made it possible to achieve a high pre-reduction ratio of about 40% in the pre-reduction furnace. In addition, the carbonized and produced char was used in the in-bath smelting reduction furnace as mixed about 20% with coal so that the VM of the carbon materials, which is detrimental to post combustion, could be reduced and the heat transfer efficiency could be improved in the in-bath smelting reduction furnace even under operation at a high post combustion ratio.

Further, as the gas temperature was reduced by the carbonization and gas reforming carried out by injecting coal (slack) into the gas combustion region at the top of the smelting reduction furnace where the gas temperature was highest, the refractory wear rate could be held to a low level despite the high post combustion ratio.

As a result, the heat consumption in the smelting reduction furnace per ton of molten iron could be reduced by the use of the highly pre-reduced ore and the amount of heat generated per unit amount of oxygen and coal could be increased by conducting the operation at a high post combustion ratio. The productivity was 25% higher than that in conventional operation, while the unit consumptions of oxygen and coal were greatly reduced.

In addition, since the injection of slack enabled the furnace gas temperature to be held to about 1730° C., the refractory wear rate could be reduced to approximately the level in low post combustion ratio operation according to the conventional method. The refractory unit consumption was thus only 2.0 kg/t and no problem arose regarding the refractory service life.

Operation was next carried out using powder iron ore instead of slack. The powder ore from the powder supply tank 106b was injected through the powder injection nozzles 107 at a position 100 mm from the wall at the furnace mouth.

As the powder ore there was used sintered powder the temperature at 200 mm from the furnace wall surface during the operation showed that, as can be seen in Table 10, a temperature reduction of 115° C. was obtained. The ore entrained by the generated gas was collected and analyzed. As a result, it was found that it had been reduced about 6%, thus further reducing the heat load on the furnace wall.

TABLE 10

|  | Without powder ore injection | With powder ore injection |
| --- | --- | --- |
| Generated gas flow rate ($Nm^3/hr$) | 40310 | 41020 |
| Post combustion ratio (%) | 40.3 | 40.9 |
| Slack injection rate (kg/min) | — | 400 |
| Gas temp. 200 mm from furnace wall (°) | 1830 | 1715 |
| Ore entrainment rate (%) | — | 51 |
| Reduction ratio of entrained ore (%) | — | 6.4 |

We claim:

1. In a method of in-bath smelting reduction of ore wherein ore is reduced and smelted by blowing oxygen onto an iron melt in a smelting furnace through a top lance while ore and coal are being supplied to the iron melt, the improvement wherein ore, coal or both ore and coal in a powder state are supplied to the iron melt surface at a gas downflow region of a circular smelting furnace extending from the center thereof toward a wall thereof by $\frac{2}{3}$ the smelting furnace radius.

2. In a method of in-bath smelting reduction of ore wherein ore is reduced and smelted by blowing oxygen onto an iron melt in a smelting furnace through a top lance while ore and coal are being supplied to the iron melt, the improvement wherein off-gas is reformed by supplying slack to a gas upflow in a region of a circular smelting furnace extending from a wall thereof toward the center thereof by $\frac{1}{3}$ the smelting furnace radius.

3. A method according to claim 2, wherein a duct is provided for discharge of a gas generated in the furnace, and the slack has a particle diameter Dp not larger than 2 mm or not larger than the value obtained from the equation $$Dp = 0.47 \cdot V^{\frac{1}{2}} \text{ (mm)}$$

where V is the gas velocity (m/sec) within the duct.

4. In a method of in-bath smelting reduction of ore wherein ore is reduced and smelted by blowing oxygen onto an iron melt in a smelting furnace through a top lance while ore and coal are being supplied to the iron melt and off-gas is used for pre-reduction of the ore, the improvement wherein off-gas is reformed by supplying slack to a gas upflow in a region of a circular smelting furnace extending from a wall thereof toward the center thereof by $\frac{1}{3}$ the smelting furnace radius and the reformed off-gas is used for pre-reduction without cooling.

5. A method according to claim 4, wherein a duct is provided for discharge of a gas generated in the furnace, and the slack has a particle diameter Dp not larger than 2 mm or not larger than the value obtained from the equation $$Dp = 0.47 \cdot V^{\frac{1}{2}} \text{ (mm)}$$

where V is the gas velocity (m/sec) within the duct.

* * * * *